(12) United States Patent
Roberts et al.

(10) Patent No.: US 6,555,363 B1
(45) Date of Patent: Apr. 29, 2003

(54) AEROBIC REDUCTION REACTOR

(76) Inventors: Gary Dean Roberts, 612 Jefferson St., Montpelier, ID (US) 83254; Verlin Jay Roberts, 1295 Lanark La., Ovid, ID (US) 83254

( * ) Notice: Subject to any disclaimer, the term of this patent is extended or adjusted under 35 U.S.C. 154(b) by 0 days.

(21) Appl. No.: 09/588,779

(22) Filed: Jun. 5, 2000

(51) Int. Cl.[7] .............................. C05F 3/06; C05F 9/02
(52) U.S. Cl. ........................... 435/290.3; 435/290.4
(58) Field of Search ........................ 435/290.1–290.4; 366/220, 225, 235

(56) References Cited

U.S. PATENT DOCUMENTS

| | | | | |
|---|---|---|---|---|
| 3,567,895 A | * | 3/1971 | Paz | |
| 3,835,480 A | * | 9/1974 | Harding | 4/449 |
| 4,633,535 A | * | 1/1987 | Louvo | 366/233 |
| 5,215,921 A | * | 6/1993 | Finn | |
| 5,244,804 A | * | 9/1993 | Horkan et al. | |
| 5,292,637 A | * | 3/1994 | Bohnensieker | |
| 6,071,740 A | * | 6/2000 | Kerouac | |

* cited by examiner

Primary Examiner—William H. Beisner
(74) Attorney, Agent, or Firm—Stephen H. Bean

(57) ABSTRACT

A dual chamber aerobic reactor for continuous flow oxidation reduction of organic wastes which includes an elongated rectangular skid, a blending chamber fixed on the skid, and an elongated drum mounted on the skid for rotation relative to the blending chamber. A device is within the blending chamber for mixing and seeding the organic waste to initiate the reduction process and the drum providing a single continuous cylindrical chamber for completion of the oxidation reduction of the organic waste. The reactor includes a device for recovering excess liquid from the blending chamber and a bio-filter for removing odors and condensing moisture from the reactor to form compost tea.

14 Claims, 4 Drawing Sheets

US 6,555,363 B1

AEROBIC REDUCTION REACTOR

The present invention relates to an aerobic reduction reactor and more particularly to an improved biological reactor which is particularly adapted for rapid oxidation reduction of solid organic wastes on a continuous flow basis.

BACKGROUND

In carrying out the variety of oxidation processes which have been proposed in the waste management field, it has been common to utilize an elongated, cylindrical vessel to enclose and enhance the decomposition of organic wastes. As shown in U.S. Pat. No. 2,241,734-Peterson and U.S. Pat. No. 2,954,285-Carlsson et al, a cylindrical container or vessel is typically mounted on rollers for rotation about its longitudinal axis. A discharge opening is provided in one end of the vessel and a loading or feed opening is provided in the opposite end. A hopper and associated feed mechanism are positioned adjacent the feed opening to supply waste material to be processed within the vessel. A fan or blower is frequently employed to draw or force air through either opening and into contact with the waste material in the vessel to provide the oxygen necessary for the aerobic reduction process.

Aerobic biological conversion vessels, such as described in the Peterson patent and as suggested by the patentee, may be combined with sorting devices, grinding mills, conveyors, drying apparatus, etc. to form an industrial plant, but are not readily adaptable to on-site, stand alone waste reduction applications because of the problems encountered in handling of the waste materials. For the best efficiency of such biological conversion vessels, the waste material should be dropped into the hopper in a continuous stream so it can be fed into the vessel to maintain the oxidation process at a constant level. However, the typical dairy barns, feedlots and poultry houses are not cleaned continuously, but rather, only at certain intervals. Therefore, provision must be made to accumulate the waste material and then dispense it to the vessel in a constant stream. This usually takes the form of a relatively large storage bin of an inverted cone or inverted pyramid configuration in association with a conveyor system to move the material from the bin to the hopper. The convergent walls of the storage bin define a relatively narrow opening at the bottom of the bin through which a continuous stream of material is directed by gravity onto the conveyor for transport to the biological conversion vessel. Such apparatus works well with dry, granular or similar discrete-particle materials which tend to pour easily. However, moist or wet solid waste materials, particularly when combined with sawdust, straw or other bedding materials, are not of uniform consistency and tend to clump together and to bridge between the convergent walls of the storage bin, thus disrupting the flow of material onto the conveyor. To overcome this problem, as well as the tendency of the moist waste material to clog the conveyors, and to thereby maintain a constant stream of material to the biological conversion vessel has required pre-conditioning the material with specialized equipment which is expensive to install and to maintain.

To facilitate close control of the environment within the rotating vessel it has been proposed to provide temperature and/or humidity monitoring devices and air supply & evacuation tubes inside the vessel, such as shown by U.S. Pat. No. 5,591,635-Young et al and U.S. Pat. No. 4,028,189-Fagerhaug et al. Since such control devices require at least occasional maintenance or replacement, some means, such as access ports, must be provided for entry into the interior of the vessel. Such access ports typically take the form of removable covers or hatches which are aligned with openings provided in the cylindrical surface of the vessel. The initial construction of such access ports is both time consuming and expensive and the use of them to gain access to the equipment mounted within the vessel requires the biological conversion process to be shut down and the vessel to be at least partially emptied. The control permitted with such equipment is thus obtained only at the price of substantial increase in costs of both the initial construction and subsequent operation of the resultant conversion vessels.

SUMMARY OF THE INVENTION

The present invention avoids the shortcomings of the prior known waste material biological conversion equipment by provision of an aerobic reduction reactor in which material handling requirements are minimized, maintenance procedures are simplified and operational shut down of the biological conversion process for equipment maintenance or repair is virtually eliminated.

The above objects are realized in the present invention by the provision of a dual chamber aerobic reactor which includes a generally rectangular blending chamber in which the biological process is initiated in a biomass while it is being blended, and an elongated cylindrical vessel operatively connected to the blending chamber in which the oxidation reduction of the biomass is completed. The blending chamber is stationary and has a smaller capacity than the cylindrical vessel which is mounted on rollers for rotation about its longitudinal axis. The blended biomass is continually moved from the chamber into the vessel by a combination of gravity and rotation of the vessel. A blower is provided to draw air into the reactor to feed the aerobic reduction process and to evacuate gases produced by the process, and means is provided for monitoring the environment within the reactor from the exterior of the vessel and chamber.

DRAWINGS

The best mode presently contemplated of carrying out the present invention will be understood from the detailed description of the preferred embodiments illustrated in the accompanying drawings in which.

DETAILED DESCRIPTION OF THE INVENTION

Figure 1:
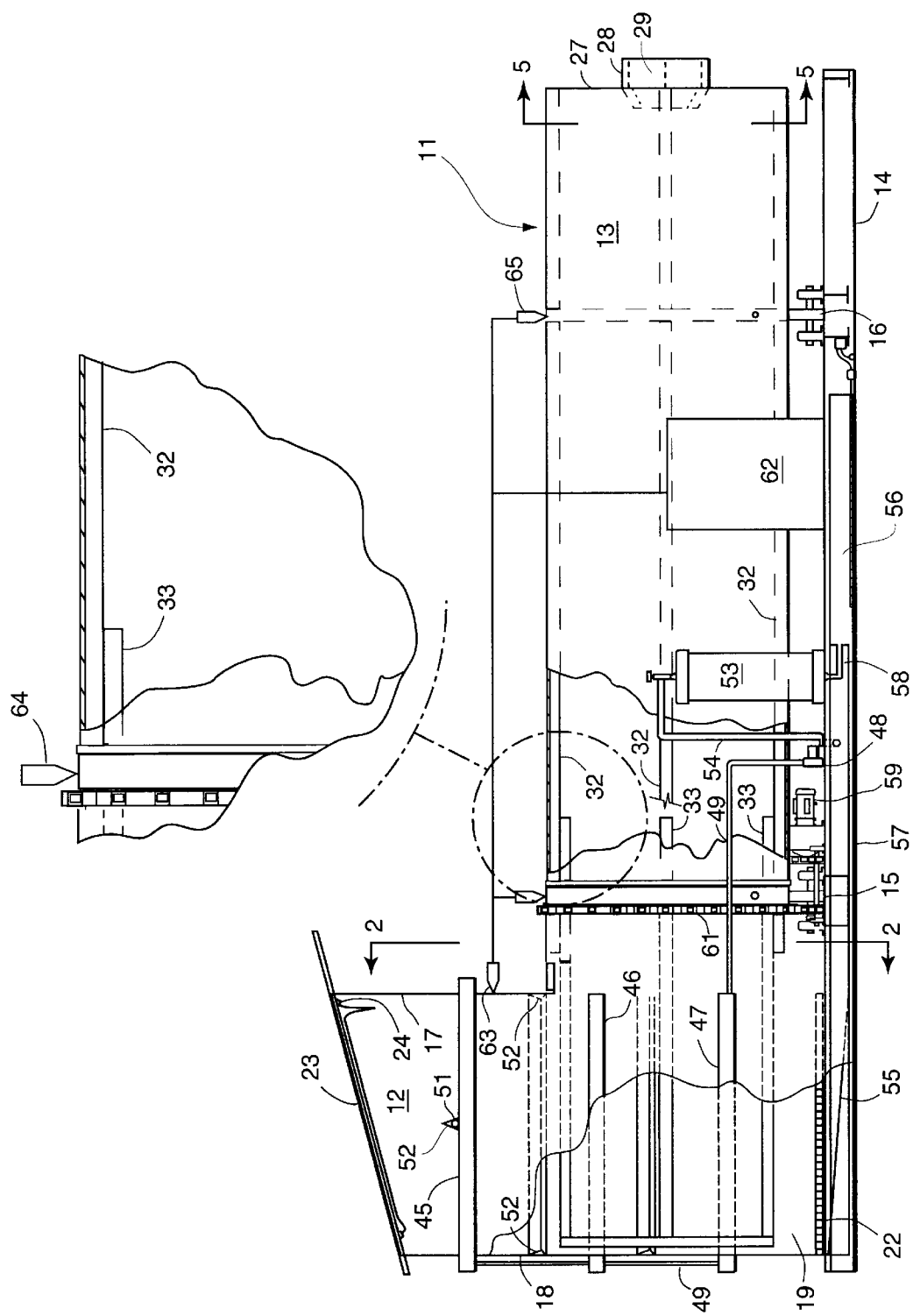
FIG. 1 is a side view, partly in section, of a dual chamber aerobic reactor according to the present invention.
Figure 2:
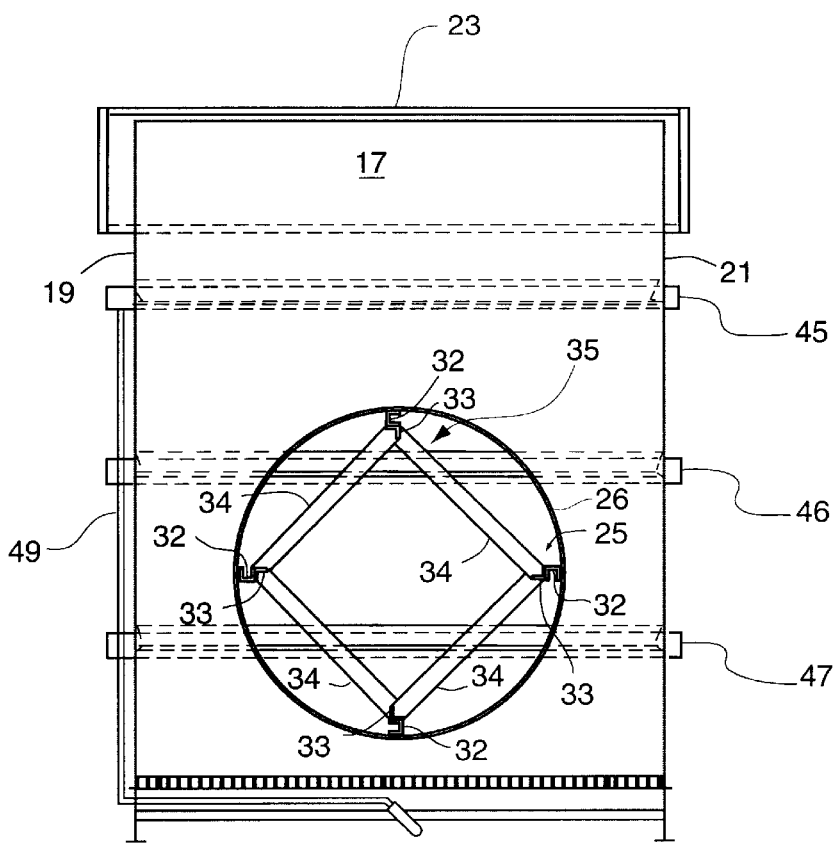
FIG. 2 is a sectional view taken along lines 2—2 of FIG. 1.
Figure 3:
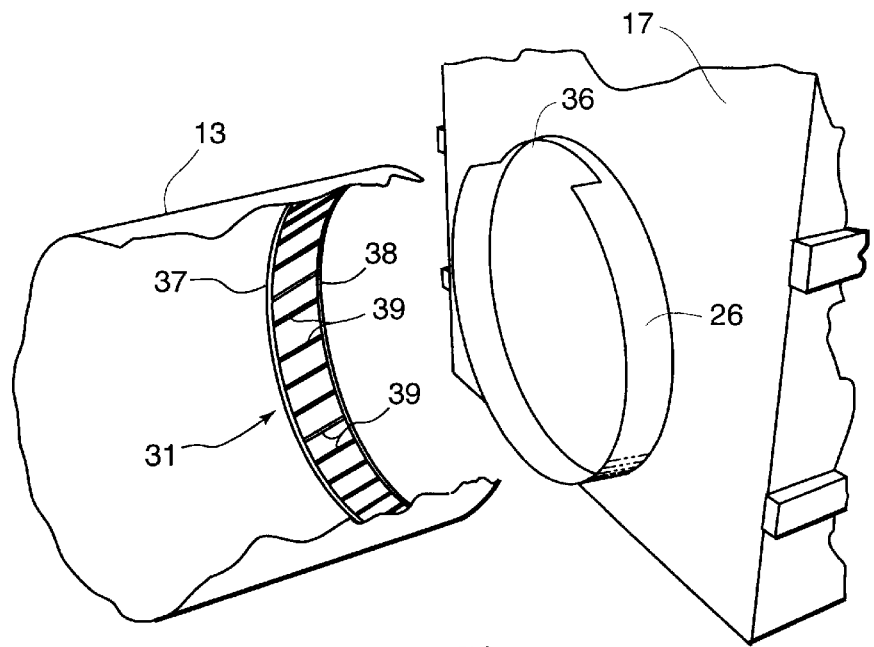
FIG. 3 is an exploded view in perspective, partly in section, of the collar 26 and mechanical seal 31 which join the two chambers of the present reactor.
Figure 4:
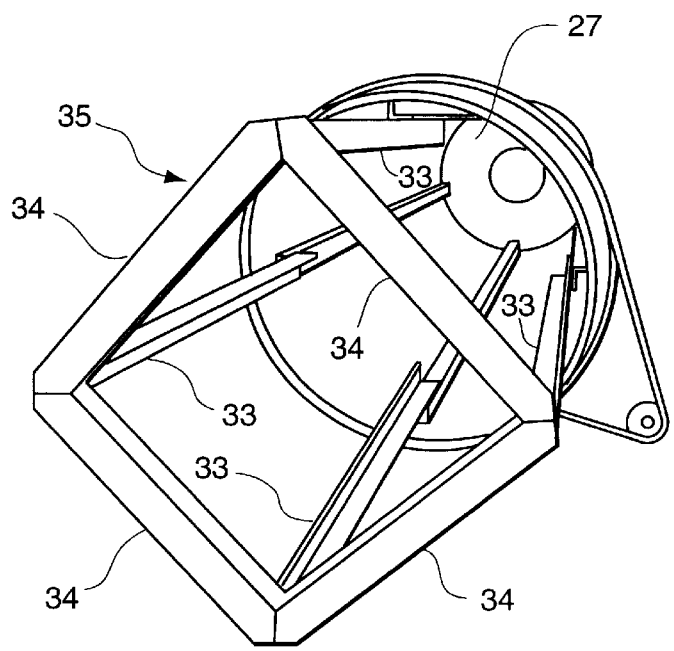
FIG. 4 is a perspective view of the blending mill cage of FIG. 2 showing how it is joined to the cylindrical vessel.

Referring more particularly to the invention as depicted in FIG. 1 of the drawing, the present invention comprises a dual chamber aerobic reactor 11 for oxidation reduction of organic wastes. The reactor 11 includes a stationary blending chamber 12, a cylindrical vessel 13 and a skid 14 which supports the blending chamber and the vessel. The cylindrical vessel 13 is supported on pairs of rollers 15 & 16 which are mounted on skid 14 to facilitate revolution of the vessel about its longitudinal axis. The blending chamber 12 has a generally-rectangular configuration and, as shown in FIG. 2, is both higher and wider than the cylindrical vessel. The blending chamber and cylindrical vessel are made of sheet steel or similar material and the exterior surfaces of both are well insulated. The blending chamber is formed with side panels 17 & 18, end panels 19 & 21, a bottom grid 22 and a lid 23 which is pivotally connected along the upper edge of panel 17 by a hinge 24. A seal (not shown) is affixed to the lower surface of the lid 23 to contact the upper edges of the side and end panels and seal the chamber 12 when the lid is closed. At the end of the cylindrical vessel 13 removed from the blending chamber, an annular end plate 27 is provided which defines a discharge opening 29. A cylindrical spout 28 is secured to the exterior surface of the end plate 27 surrounding the opening 29. As shown in FIGS. 2 & 3, a circular opening 25 is formed in the side panel 17 of the blending chamber and it is surrounded by a horizontally-protruding cylindrical collar 26 which extends several inches beyond the outer surface of the side panel 17 toward the cylindrical vessel. Referring more particularly to FIG. 2, the end of the cylindrical vessel 13 adjacent the blending chamber 12 is open and is telescoped over the cylindrical collar 26 with a mechanical seal 31 between the outer surface of the collar and the inner surface of the vessel. A plurality of elongated, radially-extending vanes 32 are mounted at intervals around the interior of the vessel and extend from the end plate 27 to the mechanical seal 31. The vanes 32 are preferably of C-channel cross-section and are welded, or otherwise firmly secured, to the interior surface of the vessel with the closed side of each channel facing in the direction of normal rotation of the vessel. As shown in FIGS. 1 & 4, a plurality of angle irons 33 are firmly secured to the vanes 32 and extend through the collar 26 and opening 25 and across the width of the blending chamber 12 into proximity with the inner surface of side panel 18. The distal ends of the angle irons are joined by lateral braces 34 to form a strong, rigid cage 35 which serve as the movable member of a blending mill. The opening 25 and collar 26 are centered along the vertical centerline of side panel 17 so as to leave a substantial clearance between the rotating cage 35 and the end panels 19 & 21 and the bottom grid 22 of the blending chamber 12.

Referring to FIG. 3, an elongated notch 36 is formed in the free edge of an upper quadrant of the collar 26. The mechanical seal 31 includes a pair of metal rings 37 & 38, each approximately one half inch thick, which are welded, or otherwise secured, to the inner surface of the vessel 13 adjacent its open end. The rings 37 & 38 are positioned parallel to each other and are joined at intervals over their entire circumference by short bars 39 of similar material which span the intermediate space between the rings. The bars 39 are generally parallel to each other and are slanted relative to the rings 37 & 38 at an acute angle opposite to the direction of normal rotation of the vessel.

Figure 5:
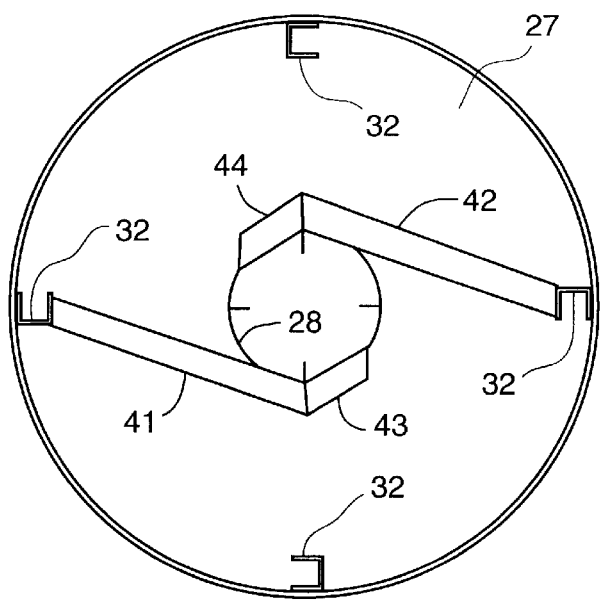
FIG. 5 is a sectional view taken along lines 5—5 of FIG. 1 showing the interior of the discharge end of the cylindrical vessel.

As shown in FIG. 5 of the drawing, a pair of oppositely-directed retaining strips 41 & 42 are mounted on the inner surface of the end plate 27. Each of the strips extends from one of the vanes 32 to an edge of the discharge opening 29. The distal ends 43 & 44 of the respective strips are each displaced at an angle of approximately forty five degrees to the body of the strip and the two strips 41 & 42 are tilted toward each other so as to overlie portions of opening 29.

The side and end panels of the blending chamber 12 are reinforced by airways 45–47 of square tubing which encircle the chamber at vertically-spaced intervals. The airways are connected to each other and to the low pressure side of a vacuum pump 48 by a system of tubing shown generally at 49. A series of perforated tubes 51 are positioned within the blending chamber 12 and are shielded by inverted V-shaped members 52. Each of the tubes 51 is connected to one of the airways 45–47 and through tubing 49 to the vacuum pump 48. The high pressure side of the vacuum pump 48 is shown as connected to a bio-filter 53 by means of tube 54, but if desired, the vacuum pump may be located downstream of the bio-filter with the high pressure side thereof discharging to the atmosphere. A rectangular pan 55 having a slanted bottom surface is positioned at the bottom of the blending chamber 12 below the grid 22. A liquid holding tank 56 is connected to the pan 55 and the bio-filter 53 by drain tubes 57 & 58, respectively.

Figure 6:
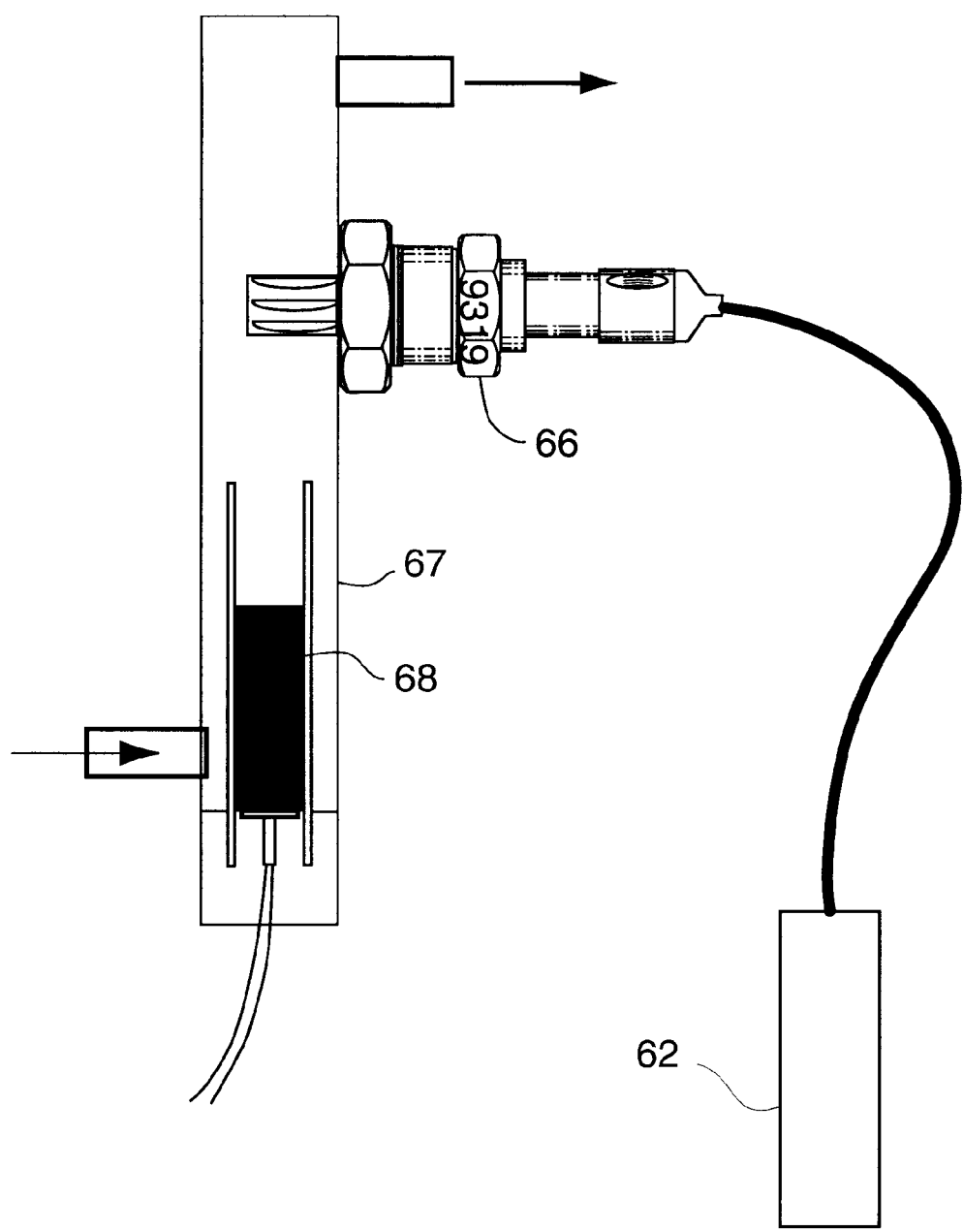
FIG. 6 is an elevation view, partly in section, of an oxygen sensor used with the aerobic reactor of FIG. 1.

The cylindrical vessel 13 is rotated by means of an electrical motor 59 acting through a chain drive 61 in response to control signals generated by a Programmable Logic Controller or computer 62. A plurality of infra-red sensors 63–65 are mounted on the exterior surfaces of the blending chamber 12 and the cylindrical vessel 13 and are connected to the computer to provide measurements of the temperatures at such surfaces. An oxygen sensor 66 is illustrated in FIG. 6 mounted in an air passageway 67 in conjunction with an electrical heater 68 and connected to the computer to provide measurements of the oxygen level within the reactor. Sensor 66 may be any suitable oxygen sensor, such as, Oxygen Sensor for a 1990 Pickup Truck K10/K1 360 CI/5.7L V8 Engine and is located in a tube 67 which can be attached to tube 49 or 54 to sample the air/gases discharged from the reactor. The heater 68 is a Vulcan Thunderbird Cartridge Heater 150 Watt 120 Volts-1600 Degree Rated and it heats the air/gas sample to 800° F. before it passes the sensor 66.

OPERATION OF THE INVENTION

In the operation of the present aerobic reduction reactor, the computer 62 is turned on and rotation of the cylindrical vessel 13 is initiated. The lid 23 is raised and the blending chamber 12 is filled with organic waste material. The lid is then closed and the vacuum pump 48 is activated to draw air/gases from blending chamber 12 and begin continuous circulation of air through discharge opening 29, into cylindrical vessel 13, and then through blending chamber 12 and bio-filter 53. The cylindrical vessel 13 normally functions efficiently when filled to between 85% and 90% of its capacity, therefore each of the C-channel vanes 32 will be in communication with the atmosphere through discharge opening 29 during approximately 10% to 15% of each cycle of rotation of the vessel. A portion of the fresh air drawn into each vane 32 travels the length of the vane and is drawn into the chamber 12 by the reduced pressure therein created by vacuum pump 48. The remainder of the air passes out of the vane through the open side of the channel and percolates through the bio-mass within the vessel 13 to provide the oxygen necessary for the aerobic decomposition process. At the same time gases formed by the decomposition of the bio-mass flow into the open side of the vane and are then transmitted to chamber 12 where they are exhausted through perforated tubes 51 and airways 45–47 by vacuum pump 48. Gases that rise to the top of the cylinder are similarly drawn into the blending chamber and exhausted through the bio-filter by the vacuum pump.

The initial quantity of waste material may be inoculated with suitable bacteria to expedite the aerobic reduction process within the blending chamber. As the cylindrical vessel 13 is rotated, the cage 35 is similarly rotated within the chamber 12 producing a churning action to blend the waste material and distribute the bacteria throughout the bio-mass. Since the blending chamber 12 is wider than the cylindrical vessel 13 and the cage 35, waste material will accumulate along both sides of the chamber and will remain there nurturing the biological process while the bulk of the bio-mass is moved through the cage 35 into the cylindrical vessel. When the blending chamber 12 is reloaded, pieces of the accumulated waste, which are by then rich in bacteria, will break off and seed the biological process within the newly added waste material as it is blended by rotation of the cage 35. The capacity of the blending chamber 12 is smaller, ⅓ to ⅔, than that of the cylindrical vessel 13. Therefore, as long as the chamber 12 is refilled at regular intervals and the necessary oxygen is supplied to the biomass, the biological reduction process will function continuously without interruption. The blended material, or biomass, is moved from the blending chamber 12 into the cylindrical vessel 13 by a combination of gravity and the rotation of the cage 35. As the biomass is forced from the blending chamber 12, the leading edge of the biomass continually crumbles and falls forward as it exceeds the angle of repose of the material and thus advances through the cylindrical vessel 13 toward the discharge opening 29. At the discharge end of the vessel 13 the biomass is initially restrained from passing through the opening 29 by the retaining strips 41, 42. Since the retaining strips are slanted towards each other and overlie opposite edges of the opening 29 they restrict the size of the opening and tend to force the biomass away from the annular end plate 27 as the vessel 13 is rotated. The biomass is thus retained within the vessel 13 to ensure completion of the oxidation process. If, for any reason, it becomes necessary to empty the vessel or accelerate discharge of the biomass, the direction of rotation of the vessel can be reversed so the distal ends 43, 44 of the retaining strips will then scoop the composted material into the opening 29.

As waste material is loaded into the blending chamber 12, excess moisture will drain off through the grating 22 at the bottom of the chamber and accumulate in the pan 55. It can then be used for various agricultural purposes or treated to become potable. Moisture driven off the bio-mass during the aerobic reduction process is transported with the air/gases by vacuum pump 48 to bio-filter 53 where it is condensed and drawn off as "compost tea" for use as a fertilizer or insecticide. The material of the biomass carried from the blending chamber into the cylindrical vessel is retained within the vessel by means of the mechanical seal 31 between the vessel and the chamber. Individual fragments of the biomass which may accumulate at the bottom of the cylindrical vessel are prevented from migrating out the open end of the vessel to the exterior of the reactor by the rings 37 and 38. Any fragments which overflow ring 37 are trapped in the spaces between the rings and the bars 39. As the vessel rotates, the bars and ring 37 carry the material fragments vertically and then drop them back into the biomass through the notch 36 in the collar 26. The mechanical seal 31 does not rely upon contact between the rings 37 & 38 and the outer surface of collar 26 to prevent leakage of fragments of the biomass from the vessel, but instead, utilizes rings 37, 38 and bars 39 to trap any fragments and return them to the biomass for continued processing.

The PLC or computer 62 is programmed to provide automatic control of the reactor 11 in response to readings of temperature, oxygen content, pH, moisture content, CN ratio, etc. A major feature of the present invention is that measurements of the various characteristics needed for control of the aerobic reduction process are obtained from the exterior of the reactor. Therefore, there is no necessity for gaining access to the interior of the reactor for the purpose of repair, calibration or replacement of the sensors utilized to monitor the aerobic reduction process. Measurements of temperatures which correspond closely to those within the blending chamber and the cylindrical vessel are obtained by infra red sensors 63–65 positioned immediately adjacent the exterior surfaces of the chamber and vessel. The sensors for the cylindrical vessel may be positioned to read the temperatures of the non-insulated tracks traced by the pairs of rollers 15, 16.

When the reactor is operating in a continuous feed mode, the bacterial decomposition process within the blending chamber 12 is carried out by bacteria and fungi operating in the mesophilic-thermophilic range, whereas the decomposition accomplished in the cylindrical vessel 13 is by thermophilic bacteria and fungi. To achieve a finished compost within approximately 48 hours, it is desirable that the temperature within the cylindrical vessel be stabilized near 158° F. and the moisture content of the biomass be maintained at 55–65% with a Carbon/Nitrogen ratio of 24–30:1. The moisture content, the C/N ratio and pH of the biomass may be measured when the lid 23 is open or at the discharge spout 28 as desired. To ensure that there is adequate oxygen present within the reactor the oxygen content of the discharge air/gases should be maintained at about 18%. The oxygen content within the reactor can be controlled by varying the amount of air drawn into chambers 12 and 13 by the vacuum pump 48. Similarly, the temperature of the bio-mass can be controlled by varying the rate at which air flows through the cylindrical vessel 13.

While the invention has been described with reference to specifically illustrated embodiments, it should be understood that various changes may be made without departing from the disclosed inventive subject matter particularly pointed out and claimed here below.

We claim:

1. A dual chamber aerobic reactor for continuous flow oxidation reduction of organic waste which includes a non-rotating blending chamber for receiving the organic waste, blending means within the blending chamber for mixing the organic waste, a rotatable second chamber operatively connected to the blending chamber and continuously open thereto through a receiving opening, said receiving opening having a width less than that of the blending chamber, and means for controlling a rate of decomposition of the organic waste within the reactor.

2. A dual chamber aerobic reactor as set forth in claim 1 wherein said blending chamber is of a generally rectangular configuration that is both wider and higher than said receiving opening, and said second chamber is an elongated cylinder mounted with its longitudinal axis approximately normal to the blending chamber and being rotatable about said axis.

3. A dual chamber aerobic reactor as set forth in claim 2 wherein said blending means includes a plurality of circumferentially spaced bars which are mounted within and extend from one end of the second chamber and protrude into the interior of the blending chamber, the distal ends of said bars being joined by lateral braces to form a geometrically-shaped cage which revolves to mix and blend the waste materials within said blending chamber when the second chamber is rotated.

4. A dual chamber aerobic reactor as set forth in claim 3 wherein the second chamber includes an annular end plate on the end removed from the cage, a movable lid mounted on an upper edge of the blending chamber, and said means for controlling a rate of decomposition includes a vacuum pump to create a below-atmospheric pressure within the reactor and draw air through the annular end plate and circulate it within the second and blending chambers.

5. A dual chamber aerobic reactor as set forth in claim 4 wherein the bottom of the blending chamber is provided with a grating and a pan to drain off and collect excess moisture from the blended waste materials, and a bio-filter connected to the vacuum pump to remove odors and moisture from the gases discharged from the reactor.

6. An aerobic reactor as set forth in claim 1 wherein said means for controlling a rate of decomposition includes a vacuum pump connected to the blending chamber to draw air through the reactor and discharge combined air/gases to the atmosphere, a bio-filter connected in series with the vacuum pump to remove odors and condense moisture from air/gases drawn from the reactor.

7. A dual chamber aerobic reactor as set forth in claim 1 wherein said blending means includes a plurality of circumferentially spaced bars that are mounted within the second chamber and extend across the receiving opening into the blending chamber, and a plurality of lateral braces secured between the distal ends of the bars to form a rigid geometrically-shaped cage which rotates with the second chamber to mix and blend organic waste within said blending chamber.

8. A dual chamber aerobic reactor as set forth in claim 7 wherein a plurality of C-shaped vanes are mounted on the internal surface of the second chamber with the closed side of each vane facing in the normal direction of rotation of the chamber, said vanes being essentially parallel to each other and spaced about the circumference of the chamber, and each of said bars being secured to one of said vanes.

9. A dual chamber aerobic reactor as set forth in claim 8 wherein a movable lid is hinged to said blending chamber to close the upper surface thereof, and a vacuum pump is connected to said blending chamber to create a below-atmospheric pressure therein and circulate air through said reactor.

10. A dual chamber aerobic reactor as set forth in claim 9 wherein a plurality of tubular airways are secured at intervals about the exterior of the blending chamber, said airways encircling said blending chamber and communicating with the interior thereof, said airways being connected to each other and to the low pressure side of said vacuum pump.

11. A dual chamber aerobic reactor as set forth in claim 10 wherein an annular end plate is secured to an end of said second chamber removed from the blending chamber, said end plate defining a discharge opening through which air is drawn into the reactor, and a plurality of retaining strips secured to the interior surface of the end plate, said retaining strips being tilted towards each other and overlying a portion of the discharge opening.

12. A dual chamber aerobic reactor as set forth in claim 11 wherein each retaining strip has one end secured to a vane and a distal end which is offset at an acute angle towards the adjacent strip in the direction opposite to the normal direction of rotation of the second chamber.

13. A dual chamber aerobic reactor as set forth in claim 12 wherein said means for controlling a rate of decomposition includes a plurality of infra red sensors positioned in immediate proximity with the exterior surfaces of the blending and second chambers, and programmable means connected to said sensors to process temperature readings therefrom and determine the operating temperatures within said blending and second chambers.

14. A dual chamber aerobic reactor as set forth in claim 13 wherein an oxygen sensor is in series with said vacuum pump to sample the air discharged from the reactor, said oxygen sensor being connected to said programmable means to process the oxygen readings from the sensor and determine the amount of oxygen being supplied to the reactor.

* * * * *